US012646642B2

(12) United States Patent
Li et al.

(10) Patent No.: US 12,646,642 B2
(45) Date of Patent: Jun. 2, 2026

(54) NANOCRYSTALLINE SOFT MAGNETIC ALLOY WITH HIGH MAGNETIC INDUCTION AND HIGH FREQUENCY AND PREPARATION METHOD THEREOF

(71) Applicant: Ningbo Institute of Materials Technology & Engineering Chinese Academy of Sciences, Ningbo (CN)

(72) Inventors: Jiawei Li, Ningbo (CN); Yu Sun, Ningbo (CN); Aina He, Ningbo (CN); Yaqiang Dong, Ningbo (CN)

(73) Assignee: NINGBO INSTITUTE OF MATERIALS TECHNOLOGY & ENGINEERING CHINESE ACADEMY OF SCIENCES, Ningbo (CN)

( * ) Notice: Subject to any disclaimer, the term of this patent is extended or adjusted under 35 U.S.C. 154(b) by 579 days.

(21) Appl. No.: 18/019,780

(22) PCT Filed: Jul. 1, 2022

(86) PCT No.: PCT/CN2022/103259
§ 371 (c)(1),
(2) Date: Feb. 3, 2023

(87) PCT Pub. No.: WO2023/130689
PCT Pub. Date: Jul. 13, 2023

(65) Prior Publication Data
US 2024/0258001 A1 Aug. 1, 2024

(30) Foreign Application Priority Data
Jan. 10, 2022 (CN) ......................... 202210020959.6

(51) Int. Cl.
*C21D 6/00* (2006.01)
*B22D 11/06* (2006.01)
(Continued)

(52) U.S. Cl.
CPC ........... *H01F 1/14766* (2013.01); *C21D 1/04* (2013.01); *C21D 1/18* (2013.01); *C21D 1/42* (2013.01);
(Continued)

(58) Field of Classification Search
CPC .. H01F 1/147; H01F 1/14766; H01F 1/15308; H01F 1/153; H01F 1/15333;
(Continued)

(56) References Cited

FOREIGN PATENT DOCUMENTS

| | | |
|---|---|---|
| CN | 102598164 | 7/2012 |
| CN | 109732078 A * | 5/2019 |

(Continued)

OTHER PUBLICATIONS

Chin, G. Review of magnetic properties of Fe—Ni alloys. IEEE transactions on magnetics. ISSN: 0018-9464, 1941-0069; DOI: 10.1109/TMAG.1971.1067014. vol. 7(1), p. 102 (Year: 2003).*

(Continued)

*Primary Examiner* — Tima M. McGuthry-Banks
(74) *Attorney, Agent, or Firm* — Jiwen Chen; Joywin IP Law PLLC

(57) ABSTRACT

Disclosed in the present invention is a nanocrystalline soft magnetic alloy with high magnetic induction and high frequency. The nanocrystalline soft magnetic alloy has a molecular formula of $Fe_aSi_bB_cMa_dCu_eP_f$, in which M includes one or more of Nb, Mo, V, Mn, and Cr, molar percent contents of elements are as follows: 6≤b≤15, 5≤c≤12, 0.5≤d≤3, 0.5≤e≤1.5, and 0.5≤f≤3, and the balance includes Fe and impurities. A difference between an induced anisotropy value and an average magnetocrystalline anisotropy value is 0.1-1 J/m$^3$. The soft magnetic alloy has high magnetic permeability and low magnetic loss at high frequency. Further disclosed in the present disclosure is a method for preparing the nanocrystalline soft magnetic alloy
(Continued)

with high magnetic induction and high frequency. Based on a repeated cycle of a thermal field, a transverse magnetic field, and a cold field, the induced anisotropy value ($K_u$) is similar to the average magnetocrystalline anisotropy value ($\langle K_1 \rangle$), so that soft magnetic properties at high frequency are improved.

13 Claims, 3 Drawing Sheets

(51) Int. Cl.

| | |
|---|---|
| ***C21D 1/04*** | (2006.01) |
| ***C21D 1/18*** | (2006.01) |
| ***C21D 1/42*** | (2006.01) |
| ***C21D 6/04*** | (2006.01) |
| ***C21D 9/08*** | (2006.01) |
| ***C22C 33/06*** | (2006.01) |
| ***C22C 38/00*** | (2006.01) |
| ***C22C 38/02*** | (2006.01) |
| ***C22C 38/04*** | (2006.01) |
| ***C22C 38/12*** | (2006.01) |
| ***C22C 38/16*** | (2006.01) |
| ***C22C 38/20*** | (2006.01) |
| ***C22C 38/22*** | (2006.01) |
| ***C22C 38/24*** | (2006.01) |
| ***C22C 38/26*** | (2006.01) |
| ***C22C 38/28*** | (2006.01) |
| ***C22C 38/32*** | (2006.01) |
| ***C22C 38/34*** | (2006.01) |
| ***C22C 38/38*** | (2006.01) |
| ***C22C 45/02*** | (2006.01) |
| ***H01F 1/147*** | (2006.01) |
| ***H01F 1/153*** | (2006.01) |
| ***H01F 41/02*** | (2006.01) |

(52) U.S. Cl.

CPC ............... *C21D 6/00* (2013.01); *C21D 6/002* (2013.01); *C21D 6/005* (2013.01); *C21D 6/008* (2013.01); *C21D 6/04* (2013.01); *C21D 9/08* (2013.01); *C22C 33/06* (2013.01); *C22C 38/002* (2013.01); *C22C 38/02* (2013.01); *C22C 38/04* (2013.01); *C22C 38/12* (2013.01); *C22C 38/16* (2013.01); *C22C 38/20* (2013.01); *C22C 38/22* (2013.01); *C22C 38/24* (2013.01); *C22C 38/26* (2013.01); *C22C 38/32* (2013.01); *C22C 38/34* (2013.01); *C22C 38/38* (2013.01); *C22C 45/02* (2013.01); *H01F 1/147* (2013.01); *H01F 1/153* (2013.01); *H01F 1/15308* (2013.01); *H01F 41/02* (2013.01); *C21D 2201/03* (2013.01); *C21D 2241/00* (2013.01); *C22C 2200/04* (2013.01); *C22C 2202/02* (2013.01)

(58) Field of Classification Search

CPC ....... H01F 41/02; C22C 33/06; C22C 38/002; C22C 38/02; C22C 38/04; C22C 38/12; C22C 38/16; C22C 38/20; C22C 38/22; C22C 38/24; C22C 38/26; C22C 38/28; C22C 38/32; C22C 38/34; C22C 38/38; C22C 45/02; C21D 1/04; C21D 1/18; C21D 1/42; C21D 6/002; C21D 6/005; C21D 6/008; C21D 6/04; C21D 9/08; C21D 2201/03; C21D 2241/00; C21D 2200/04; C21D 2202/02; B22D 11/0611; B22D 11/06

See application file for complete search history.

(56) References Cited

FOREIGN PATENT DOCUMENTS

| | | | |
|---|---|---|---|
| CN | 110387500 | 10/2019 | |
| JP | H10306314 | 11/1998 | |
| WO | WO-2010081993 A1 * | 7/2010 | ......... H01F 1/15333 |
| WO | WO-2018062310 A1 * | 4/2018 | ........... H01F 41/005 |

OTHER PUBLICATIONS

WO 2010/081993 A1 machine translation of the description (Year: 2010).*

WO 2018/062310 A1 machine translation of the document (Year: 2018).*

CN109732078A machine translation (Year: 2019).*

* cited by examiner

NANOCRYSTALLINE SOFT MAGNETIC ALLOY WITH HIGH MAGNETIC INDUCTION AND HIGH FREQUENCY AND PREPARATION METHOD THEREOF

This is a U.S. national stage application of PCT Application No. PCT/CN2022/103259 under 35 U.S.C. 371, filed Jul. 1, 2022 in Chinese, claiming priority of Chinese Application No. 202210020959.6, filed Jan. 10, 2022, all of which are hereby incorporated by reference.

FIELD OF TECHNOLOGY

The present disclosure belongs to the technical field of iron-based nanocrystalline soft magnetic alloy materials, and specifically relates to a nanocrystalline soft magnetic alloy with high magnetic induction and high frequency and a preparation method thereof.

BACKGROUND TECHNOLOGY

With rapid development of 5G communication, wireless charging, and other technologies, electromagnetic interference, health hazards, and other problems caused by electromagnetic radiation are becoming increasingly serious. Soft magnetic materials are common materials for suppressing interference of a magnetic field. Since low-frequency electromagnetic waves (with a frequency of less than 300 kHz) have a low skin effect and low wave impedance, the materials have low radiation absorption and reflection loss of a magnetic field at low frequency. Thus, the problem of magnetic shielding at low frequency has always been a difficulty in research. Materials with high magnetic permeability can be used for restraining a magnetic line of force in a channel with very low magnetic resistance, so that a protected device is free from the interference of a magnetic field. Thus, soft magnetic materials with high magnetic permeability are the most effective materials for reducing the electromagnetic radiation at low frequency. Compared with traditional low-frequency magnetic shielding materials (such as low-carbon steel, silicon steel sheet, and permalloy), FeSiBMCu series nanocrystalline alloys have high saturation magnetic induction intensity and high magnetic permeability, and have been widely used in electromagnetic compatibility, power electronics, and other fields.

With development of power electronic equipment to miniaturization and high frequency, new challenges have been proposed to the magnetic shielding materials, and market demands cannot be completely met by traditional nanocrystalline soft magnetic materials. An iron-based nanocrystalline soft magnetic alloy with excellent high frequency is researched. That is to say, the alloy has high cut-off frequency while maintaining high saturation magnetic induction intensity, high magnetic permeability at high frequency and low loss, which becomes a trend of development in the future. At present, a lot of research and industrialization work have been carried out by research persons at home and abroad based on the classic FeSiBMCu series nanocrystalline alloys, and a series of progresses have been made. Due to a structure that a fine and uniform nanocrystalline grain with a grain size of about 10-12 nm is embedded on an amorphous matrix, the magnetocrystalline anisotropy is averaged. Under the combined action of low average magnetocrystalline anisotropy and nearly zero magnetoelastic anisotropy, an iron-based nanocrystalline alloy with low coercivity, high saturation magnetic induction intensity, and high magnetic permeability is obtained.

However, the magnetic permeability is rapidly reduced at high frequency, and the cut-off service frequency is mostly only dozens of kHz. Moreover, the loss is serious at high frequency, and the development of the power electronic equipment to miniaturization, energy saving, and high frequency is not facilitated. Therefore, it is urgent to improve properties of the nanocrystalline alloy with high saturation magnetic induction intensity at high frequency at present. Magnetic anisotropy plays an important role in the series of problems. Moreover, the magnetic anisotropy has a close effect on soft magnetic properties and a magnetic domain capable of showing a magnetization result. Therefore, how to regulate the magnetic anisotropy to improve the soft magnetic properties of iron-based amorphous nanocrystallines at high frequency becomes an important topic in related fields.

According to a Chinese patent document with a publication number of CN101796207A, a FeSiBMCu nanocrystalline alloy system is disclosed. M is at least one element of Ti, V. Zr, Nb, Mo, Hf. Ta, and W. The nanocrystalline alloy has low magnetic anisotropy, high magnetic permeability, and low coercivity. However, the standard composition has a saturation magnetic induction intensity of only 1.24 T, which needs to be further improved.

According to a Chinese patent document with a publication number of CN112877615A, a FeSiBCuPC nanocrystalline alloy system is disclosed. By using a high content of Fe, high saturation magnetic induction intensity is achieved. By adding the elements Si, B, Cu, P, and C and optimizing the contents, the problems of low amorphous forming ability and limited thickness and width of a strip of the alloy system with a high content of Fe are solved. However, the problem of high magnetic anisotropy has not been solved yet, the soft magnetic properties at high frequency are poor, and the application range is limited.

SUMMARY OF INVENTION

The present invention provides a nanocrystalline soft magnetic alloy with high magnetic induction and high frequency. The soft magnetic alloy has high magnetic permeability and low magnetic loss at high frequency.

A nanocrystalline soft magnetic alloy with high magnetic induction and high frequency has a molecular formula of $Fe_aSi_bB_cM_dCu_eP_f$, in which M includes one or more of Nb, Mo, V, Mn, and Cr, molar percent contents of elements are as follows: $6 \le b \le 15$, $5 \le c \le 12$, $0.5 \le d \le 3$, $0.5 \le e \le 1.5$, and $0.5 \le f \le 3$, and the balance includes Fe and impurities; and a difference between an induced anisotropy value ($K_u$) and an average magnetocrystalline anisotropy value ($\langle K_1 \rangle$) is 0.1-1 J/m$^3$.

Both the induced anisotropy value and the average magnetocrystalline anisotropy value are greater than 5 J/m$^3$ and less than 20 J/m$^3$.

The nanocrystalline soft magnetic alloy with high magnetic induction and high frequency has a saturation magnetic induction intensity $B_s$ of greater than 1.45 T and a coercivity of less than 2 A/m.

The nanocrystalline soft magnetic alloy with high magnetic induction and high frequency has a magnetic permeability of greater than 20,000 at a frequency of less than 100 kHz.

The nanocrystalline soft magnetic alloy with high magnetic induction and high frequency has a loss of less than 250 kW/m$^3$ at a frequency of less than 100 kHz in a transverse magnetic field of less than 0.2 T.

According to the composition of the present disclosure, since an FeSiBMCu alloy is doped with a trace amount of the element P, the nucleation rate of a grain is increased under the condition of ensuring the saturation magnetic induction intensity, the growth rate of the grain is inhibited, and the grain size and distribution of the grain are basically remained unchanged under high temperature conditions for a long time, so that the thermal stability and soft magnetic properties of the alloy are improved. The nanocrystalline alloy with a suitable $\langle K_1 \rangle$ value is obtained. Moreover, the $K_u$ value is regulated by transverse magnetism, so that the $K_u$ value is similar to the $\langle K_1 \rangle$ value, and thus high soft magnetic properties at high frequency are obtained.

The present disclosure further provides a method for preparing the nanocrystalline soft magnetic alloy with high magnetic induction and high frequency. The method comprises:

(1) performing compounding according to the atomic percent molecular formula of the nanocrystalline soft magnetic alloy with high magnetic induction and high frequency so as to obtain a master alloy; melting the master alloy to obtain a melt, and spraying the melt onto a rotating cooling copper roller for cooling and solidification to obtain an amorphous alloy with a long-range disordered structure, namely a quenched alloy strip; and preparing a magnetic core from the quenched alloy strip by a superimposed cutting method and a winding method;

(2) putting the magnetic core in a thermal field for heat preservation at 480-640° C. for 0.5-1.5 hours; putting the magnetic core in a 0-1 T transverse magnetic field for heat preservation at 380-420° C. for 0.5-1.5 hours; putting the magnetic core in a liquid nitrogen environment for cooling for 0.5-1 hour; taking the magnetic core out of the liquid nitrogen environment; and then putting the magnetic core in an environment for heat preservation at 200-300° C. for 0.5-1 hour; and (3) repeating step (2) for 1-5 times to obtain the nanocrystalline soft magnetic alloy with high magnetic induction and high frequency.

The magnetic core is put in the thermal field for heat preservation at 480-640° C. for 0.5-1.5 hours, so that the stress of the quenched alloy strip and the density of a quasi-dislocation dipole are reduced, the magnetocrystalline anisotropy is reduced, and the formation of a uniform strip wide domain at a pinning point is reduced. Then, the magnetic core with a grain size of about 10-20 nm was put in the 0-1 T transverse magnetic field for heat preservation at 380-420° C. for 0.5-1.5 hours, so that the soft magnetic alloy has specific induced magnetic anisotropy under the interaction of the magnetic field and atoms in the magnetic core. The magnetic core is put in the liquid nitrogen environment for cooling for 0.5 hour, taken out, and then put in an environment for heat preservation at 200-300° C. for 0.5-1 hour. A cycle of cooling and heating is repeated for 1-5 times for inducing the uniaxial $K_u$ value to be matched with the $\langle K_1 \rangle$ value. Under the combined action of the two values, the magnetic permeability at high frequency is improved, and the loss at high frequency is reduced.

After the iron-based nanocrystalline magnetic core is subjected to heat treatment in the transverse magnetic field, a greater $K_u$ value is induced with the increase of temperature, and the slope of a magnetic hysteresis loop is greater. Under the action of the induced anisotropy, not only is a magnetic domain shifted and split, but also the $K_u$ value competes with the $\langle K_1 \rangle$ value, and magnetization at high frequency is affected by dominated rotation of the magnetic domain. When $\langle K_1 \rangle / K_u$ is equal to about 1, the movement of the magnetic domain is suppressed at high frequency, and convenience is provided for reducing the resulting eddy current loss, so that the magnetic permeability is improved, and the loss is reduced.

After the iron-based nanocrystalline magnetic core is subjected to heat treatment in the transverse magnetic field, the diffusion rate of atoms is increased at high temperature, and the grain has a <100> texture. Meanwhile, due to the texture, the averaging of the magnetocrystalline anisotropy is weakened, the magnetocrystalline anisotropy with a longer range and a larger value is induced, and the easy magnetization direction and the macroscopic magnetic anisotropy are disturbed to be changed, resulting in serious deterioration of magnetic properties at high frequency. However, in the present disclosure, when the magnetic core treated in the transverse magnetic field is cooled by liquid nitrogen and then put in an environment for heat preservation at 200-300° C. for 0.5-1 hour, the above situations are avoided. It is ensured that the magnetocrystalline anisotropy is similar to the induced anisotropy, and finally, good soft magnetic properties at high frequency are achieved.

The magnetic core is a cylinder.

The magnetic core is a cylinder with an outer diameter of 21-23 mm and an inner diameter of 18-20 mm.

The cooling copper roller is rotated at a speed of 25 m/s to 40 m/s.

Before the magnetic core is put in the transverse magnetic field, the magnetic core has a grain size of 10-20 nm.

Compared with the prior art, the present disclosure has the following beneficial effects.

(1) In the present disclosure, by adjusting the magnetic anisotropy, the obtained $K_u$ value is similar to the $\langle K_1 \rangle$ value, which is greater than 5 $J/m^3$ and less than 20 $J/m^3$, so that the iron-based nanocrystalline magnetic core with high saturation magnetic induction intensity, high magnetic permeability at high frequency, and low loss is obtained.

(2) In the present disclosure, after the heat treatment is completed under the combined action of the thermal field and the magnetic field, the obtained saturation magnetic induction intensity $B_s$ is greater than 1.45 T, the magnetic permeability at 100 kHz is greater than 20,000, the loss at 100 kHz and 0.2 T is less than 250 $kW/m^3$, and the coercivity is less than 2 A/m.

(3) In the present disclosure, the microstructure and the magnetic anisotropy of the grain are adjusted in real time by using the thermal field, the magnetic field, and a magnetic field-cold field, so that the $K_u$ value is matched with the $\langle K_1 \rangle$ value. The movement and rotation of the wall of the domain are matched, so that the eddy current loss at high frequency is suppressed, and properties at high frequency are optimized.

(4) The magnetic core of the nanocrystalline alloy prepared by the present disclosure has excellent properties at high frequency. When the nanocrystalline alloy is used in 5G+ common mode inductors, wireless charging, and other devices, the effects of miniaturization, high efficiency, low energy consumption and environment-friendly energy conservation can be achieved, and the product market and application prospect of power electronic devices can be broadened.

DESCRIPTION OF THE EMBODIMENTS

Figure 1:
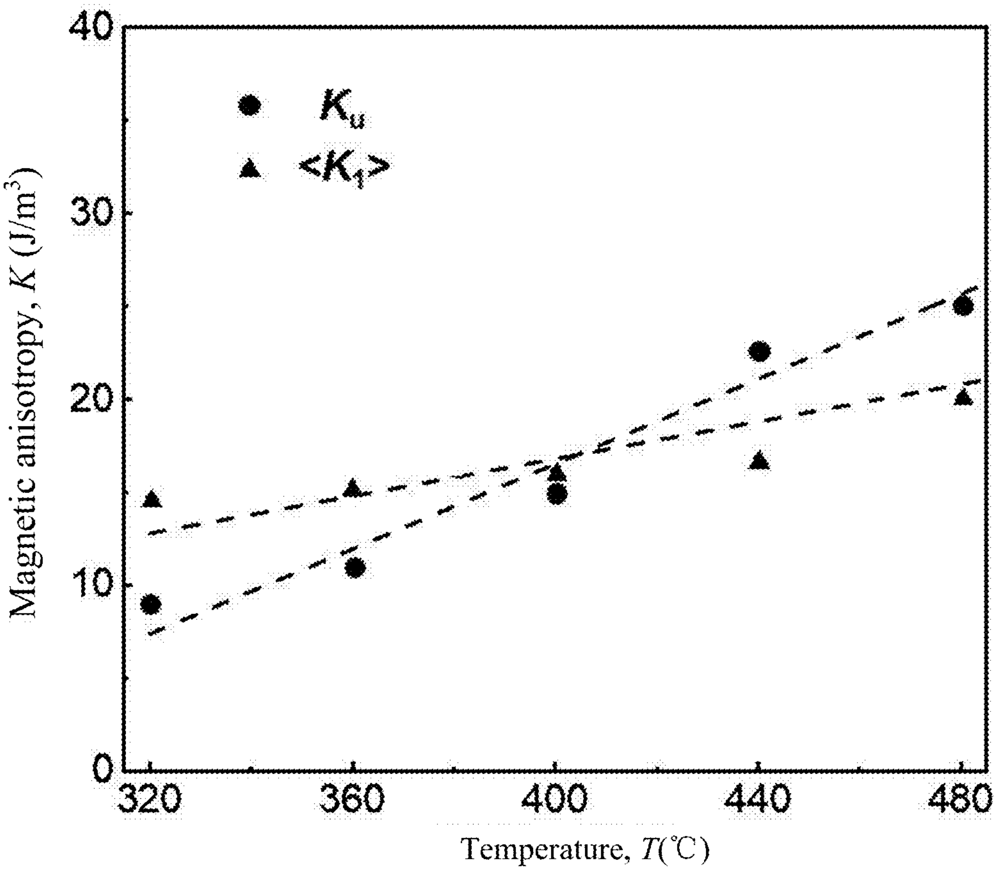
FIG. 1 is a diagram showing comparison of the average magnetocrystalline anisotropy and the induced anisotropy of $Fe_{77.8}Si_{10}B_8Nb_{2.6}Cu_{0.6}P_1$ prepared in Comparative Examples 1 and 2, Example 2, and Comparative Examples 3 and 4.

The present disclosure is further described in detail below in conjunction with embodiments and accompanying drawings. It should be noted that the following embodiments are merely intended to facilitate the understanding of the present disclosure without any limitation to the present disclosure.

Example 1

In the example, an iron-based nanocrystalline soft magnetic alloy material has a molecular formula of $Fe_{76}Si_{11}B_8Nb_2Cu_1Mo_1P_1$.

A specific method for preparing the iron-based nanocrystalline alloy is as follows.

(1) Compounding was performed according to the chemical 1 formula of $Fe_{76}Si_{11}B_8Nb_2Cu_1Mo_1P_1$ with industrially pure Fe, Si, FeB, FeP, Cu, FeMo, and FeNb as raw materials so as to obtain a master alloy. The master alloy was subjected to melting and treatment by using a single-roller quenching technology to obtain a quenched amorphous strip with a width of about 60 mm and a thickness of about 18 μm, wherein a copper roller was rotated at a speed of 30 m/s. The strip was cut and wound into a magnetic core with a width of 10 mm, an inner diameter of 19.7 mm, and an outer diameter of 22.6 mm.

(2) The $Fe_{76}Si_{11}B_8Nb_2Cu_1Mo_1P_1$ alloy was subjected to nanocrystalline heat treatment. The alloy strip was heated to 560° C. at a heating rate of 5° C./min for heat preservation for 0.5 hour, and then cooled to room temperature with a furnace.

(3) An alloy magnetic core obtained after the heat treatment was uniformly divided into 8 parts, which were heated to 200° C. at a heating rate of 10° C./min, heated to 400° C. at a heating rate of 10° C./min for heat preservation for 1 hour in a 0.08 T transverse magnetic field, put in a liquid nitrogen environment for cooling for 0.5 hour, taken out, and then put in an environment for heat preservation at 250° C. for 0.5 hour. A cycle of cooling and heating was repeated for 3 times.

(4) An initial magnetization curve of a magnetic ring was measured. In an initial magnetization curve stage, a tangent was obtained and extended to saturation magnetization. With the corresponding abscissa value as an anisotropy field ($H_k$), an induced anisotropy value is calculated based on the formula $K_u=\frac{1}{2} H_kB_s$. After the heat treatment in step (2) and step (3), it was calculated that the nanocrystalline magnetic core has a $K_u$ value of 12.8 J/m$^3$. The crystallization volume fraction $V_{cr}$ and the grain size D were obtained according to analysis of XRD and TEM results. Based on the formula $\langle K_1\rangle=K_1V_{cr}(D/L_0)^6$ ($K_1$ refers to magnetocrystalline anisotropy of an α-Fe(Si) phase and has a value of 8.2 KJ/m$^3$; $V_{cr}$ refers to crystallization volume fraction; and $L_0$ refers to ferromagnetic exchange length and has a value of about 35 nm), it was calculated that the $\langle K_1\rangle$ value is 13 J/m$^3$. The $K_u$ value is similar to the $\langle K_1\rangle$ value.

(5) A nanocrystalline obtained under the conditions of step (2) to step (4) has excellent soft magnetic properties at high frequency including a saturation magnetic induction intensity $B_s$ of 1.5 T, a coercivity $H_c$ of 1.5 A/m, a magnetic permeability u of 21,600 at 100 kHz, and a loss $P_s$ of 180 kW/m$^3$ at 100 kHz and 0.2 T.

Example 2

In the example, an iron-based nanocrystalline soft magnetic alloy material has a molecular formula of $Fe_{77.8}Si_{10}B_8Nb_{2.6}Cu_{0.6}P_1$.

A specific method for preparing the iron-based nanocrystalline alloy is as follows.

(1) Compounding was performed according to the chemical formula of $Fe_{77.8}Si_{10}B_8Nb_{2.6}Cu_{0.6}P_1$ with industrially pure Fe, Si, FeB, FeP, Cu, and FeNb as raw materials so as to obtain a master alloy. The master alloy was subjected to melting and treatment by using a single-roller quenching technology to obtain a quenched amorphous strip with a width of about 60 mm and a thickness of about 18 μm, wherein a copper roller was rotated at a speed of 30 m/s. The strip was cut and wound into a magnetic core with a width of 10 mm, an inner diameter of 19.7 mm, and an outer diameter of 22.6 mm.

(2) The $Fe_{77.8}Si_{10}B_8Nb_{2.6}Cu_{0.6}P_1$ alloy was subjected to nanocrystalline heat treatment. The alloy strip was heated to 560° C. at a heating rate of 5° C./min for heat preservation for 0.5 hour, and then cooled to room temperature with a furnace.

(3) An alloy magnetic core obtained after the heat treatment was uniformly divided into 8 parts, which were heated to 200° C. at a heating rate of 10° C./min, heated to 400° C. at a heating rate of 10° C./min for heat preservation for 1 hour in a 0.08 T transverse magnetic field, put in a liquid nitrogen environment for 0.5 hour, taken out, and then put in an environment for heat preservation at 280° C. for 0.5 hour. A cycle of cooling and heating was repeated for 2 times.

(4) An initial magnetization curve of a magnetic ring was measured. In an initial magnetization curve stage, a tangent was obtained and extended to saturation magnetization. With the corresponding abscissa value as an anisotropy field ($H_k$), an induced anisotropy value is calculated based on the formula $K_u=\frac{1}{2} H_kB_s$. After the heat treatment in step (2) and step (3), it was calculated that the nanocrystalline magnetic core has a $K_u$ value of 15.8 J/m$^3$. The crystallization volume fraction $V_{cr}$ and the grain size D were obtained according to analysis of XRD and TEM results. Based on the formula $\langle K_1\rangle=K_1V_{cr}(D/L_0)^6$ ($K_1$ refers to magnetocrystalline anisotropy of an α-Fe(Si) phase and has a value of 8.2 KJ/m$^3$; $V_{cr}$ refers to crystallization volume fraction; and $L_0$ refers to ferromagnetic exchange length and has a value of about 35 nm), it was calculated that the $\langle K_1\rangle$ value is 16.1 J/m$^3$. The $K_u$ value is similar to the $\langle K_1\rangle$ value.

(5) A nanocrystalline obtained under the conditions of step (2) to step (4) has excellent soft magnetic properties at high frequency including a saturation magnetic induction intensity $B_s$ of 1.5 T, a coercivity $H_c$ of 1.6 A/m, a magnetic permeability u of 20,000 at 100 kHz, and a loss $P_s$ of 205 kW/m$^3$ at 100 kHz and 0.2 T.

Example 3

In the example, an iron-based nanocrystalline soft magnetic alloy material has a molecular formula of $Fe_{77}Si_{12}B_7Nb_2Cu_1P_1$.

A specific method for preparing the iron-based nanocrystalline alloy is as follows.

(1) Compounding was performed according to the chemical formula of $Fe_{77}Si_{12}B_7Nb_2Cu_1P_1$ with industrially pure Fe, Si, FeB, FeP, Cu, and FeNb as raw materials so as to obtain a master alloy. The master alloy was subjected to melting and treatment by using a single-roller quenching technology to obtain a quenched amorphous strip with a width of about 60 mm and a thickness of about 18 μm, wherein a copper roller was rotated at a speed of 30 m/s. The strip was cut and wound into a magnetic core with a width of 10 mm, an inner diameter of 19.7 mm, and an outer diameter of 22.6 mm.

(2) The $Fe_{77}Si_{12}B_7Nb_2Cu_1P_1$ alloy was subjected to nanocrystalline heat treatment. The alloy strip was heated to 580° C. at a heating rate of 5° C./min for heat preservation for 0.5 hour, and then cooled to room temperature with a furnace.

(3) An alloy magnetic core obtained after the heat treatment was uniformly divided into 8 parts, which were heated to 200° C. at a heating rate of 10° C./min, heated to 380° C. at a heating rate of 10° C./min for heat preservation for 1 hour in a 0.08 T transverse magnetic field, put in a liquid nitrogen environment for 0.5 hour, taken out, and then put in an environment for heat preservation at 220° C. for 0.5 hour. A cycle of cooling and heating was repeated for 4 times.

(4) An initial magnetization curve of a magnetic ring was measured. In an initial magnetization curve stage, a tangent was obtained and extended to saturation magnetization. With the corresponding abscissa value as an anisotropy field ($H_k$), an induced anisotropy value is calculated based on the formula $K_u=\frac{1}{2} H_k B_s$. After the heat treatment in step (2) and step (3), it was calculated that the nanocrystalline magnetic core has a $K_u$ value of 8.6 J/m$^3$. The crystallization volume fraction $V_{cr}$ and the grain size D were obtained according to analysis of XRD and TEM results. Based on the formula $\langle K_1\rangle=K_1V_{cr}(D/L_0)^6$ ($K_1$ refers to magnetocrystalline anisotropy of an α-Fe(Si) phase and has a value of 8.2 KJ/m$^3$; $V_{cr}$ refers to crystallization volume fraction; and $L_0$ refers to ferromagnetic exchange length and has a value of about 35 nm), it was calculated that the $\langle K_1\rangle$ value is 8.3 J/m$^3$. The $K_u$ value is similar to the $\langle K_1\rangle$ value.

(5) A nanocrystalline obtained under the conditions of step (2) to step (4) has excellent soft magnetic properties at high frequency including a saturation magnetic induction intensity $B_s$ of 1.46 T, a coercivity $H_c$ of 2 A/m, a magnetic permeability u of 25,000 at 100 kHz, and a loss $P_s$ of 220 kW/m$^3$ at 100 kHz and 0.2 T.

Example 4

In the example, an iron-based nanocrystalline soft magnetic alloy material has a molecular formula of $Fe_{73.7}Si_{11}B_{10}Nb_{2.5}Cu_1Mn_1P_{0.8}$.

A specific method for preparing the iron-based nanocrystalline alloy is as follows.

(1) Compounding was performed according to the chemical formula of $Fe_{73.7}Si_{11}B_{10}Nb_{2.5}Cu_1Mn_1P_{0.8}$ with industrially pure Fe, Si, FeB, FeP, Cu, Mn, and FeNb as raw materials so as to obtain a master alloy. The master alloy was subjected to melting and treatment by using a single-roller quenching technology to obtain a quenched amorphous strip with a width of about 60 mm and a thickness of about 18 μm, wherein a copper roller was rotated at a speed of 30 m/s. The strip was cut and wound into a magnetic core with a width of 10 mm, an inner diameter of 19.7 mm, and an outer diameter of 22.6 mm.

(2) The $Fe_{73.7}Si_{11}B_{10}Nb_{2.5}Cu_1Mn_1P_{0.8}$ alloy was subjected to nanocrystalline heat treatment. The alloy strip was heated to 580° C. at a heating rate of 5° C./min for heat preservation for 0.5 hour, and then cooled to room temperature with a furnace.

(3) An alloy magnetic core obtained after the heat treatment was uniformly divided into 8 parts, which were heated to 200° C. at a heating rate of 10° C./min, heated to 380° C. at a heating rate of 10° C./min for heat preservation for 1 hour in a 0.08 T transverse magnetic field, put in a liquid nitrogen environment for 0.5 hour, taken out, and then put in an environment for heat preservation at 260° C. for 1 hour. A cycle of cooling and heating was repeated for 2 times.

(4) An initial magnetization curve of a magnetic ring was measured. In an initial magnetization curve stage, a tangent was obtained and extended to saturation magnetization. With the corresponding abscissa value as an anisotropy field ($H_k$), an induced anisotropy value is calculated based on the formula $K_u=\frac{1}{2} H_k B_s$. After the heat treatment in step (2) and step (3), it was calculated that the nanocrystalline magnetic core has a $K_u$ value of 12.2 J/m$^3$. The crystallization volume fraction $V_{cr}$ and the grain size D were obtained according to analysis of XRD and TEM results. Based on the formula $\langle K_1\rangle=K_1V_{cr}(D/L_0)^6$ ($K_1$ refers to magnetocrystalline anisotropy of an α-Fe(Si) phase and has a value of 8.2 KJ/m$^3$; $V_{cr}$ refers to crystallization volume fraction; and $L_0$ refers to ferromagnetic exchange length and has a value of about 35 nm), it was calculated that the $\langle K_1\rangle$ value is 11.7 J/m$^3$. The $K_u$ value is similar to the $\langle K_1\rangle$ value.

(5) A nanocrystalline obtained under the conditions of step (2) to step (4) has excellent soft magnetic properties at high frequency including a saturation magnetic induction intensity $B_s$ of 1.45 T, a coercivity $H_c$ of 1.8 A/m, a magnetic permeability u of 23,400 at 100 kHz, and a loss $P_s$ of 250 kW/m$^3$ at 100 kHz and 0.2 T.

Example 5

In the example, an iron-based nanocrystalline soft magnetic alloy material has a molecular formula of $Fe_{77.5}Si_{12}B_6Nb_1Cu_{1.5}Mo_{0.5}V_{0.5}P_1$.

A specific method for preparing the iron-based nanocrystalline alloy is as follows.

(1) Compounding was performed according to the chemical formula of $Fe_{77.5}Si_{12}B_6Nb_1Cu_{1.5}Mo_{0.5}V_{0.5}P_1$ with industrially pure Fe, Si, FeB, FeP, Cu, V, FeMo, and FeNb as raw materials so as to obtain a master alloy. The master alloy was subjected to melting and treatment by using a single-roller quenching technology to obtain a quenched amorphous strip with a width of about 60 mm and a thickness of about 18 μm, wherein a copper roller was rotated at a speed of 30 m/s. The strip was cut and wound into a magnetic core with a width of 10 mm, an inner diameter of 19.7 mm, and an outer diameter of 22.6 mm.

(2) The $Fe_{77.5}Si_{12}B_6Nb_1Cu_{1.5}Mo_{0.5}V_{0.5}P_1$ alloy was subjected to nanocrystalline heat treatment. The alloy strip was heated to 580° C. at a heating rate of 5° C./min for heat preservation for 0.5 hour, and then cooled to room temperature with a furnace.

(3) An alloy magnetic core obtained after the heat treatment was uniformly divided into 8 parts, which were heated to 200° C. at a heating rate of 10° C./min, heated to 380° C. at a heating rate of 10° C./min for heat preservation for 1 hour in a 0.08 T transverse magnetic field, put in a liquid nitrogen environment for 0.5 hour, taken out, and then put in an environment for heat preservation at 260° C. for 0.5 hour. A cycle of cooling and heating was repeated for 2 times.

(4) An initial magnetization curve of a magnetic ring was measured. In an initial magnetization curve stage, a tangent was obtained and extended to saturation magnetization. With the corresponding abscissa value as an anisotropy field ($H_k$), an induced anisotropy value is calculated based on the formula $K_u=½ H_kB_s$. After the heat treatment in step (2) and step (3), it was calculated that the nanocrystalline magnetic core has a $K_u$ value of 19 J/m$^3$. The crystallization volume fraction $V_{cr}$ and the grain size D were obtained according to analysis of XRD and TEM results. Based on the formula $<K_1>=K_1V_{cr}(D/L_0)^6$ ($K_1$ refers to magnetocrystalline anisotropy of an α-Fe(Si) phase and has a value of 8.2 KJ/m$^3$; $V_{cr}$ refers to crystallization volume fraction; and $L_0$ refers to ferromagnetic exchange length and has a value of about 35 nm), it was calculated that the $<K_1>$ value is 18.9 J/m$^3$. The $K_u$ value is similar to the $<K_1>$ value.

(5) A nanocrystalline obtained under the conditions of step (2) to step (4) has excellent soft magnetic properties at high frequency including a saturation magnetic induction intensity $B_s$ of 1.52 T, a coercivity $H_c$ of 1.5 A/m, a magnetic permeability μ of 20,300 at 100 kHz, and a loss $P_s$ of 190 kW/m$^3$ at 100 kHz and 0.2 T.

Example 6

In the example, an iron-based nanocrystalline soft magnetic alloy material has a molecular formula of $Fe_{76.5}Si_{10}B_8Nb_1Cu_{1.5}Cr_1V_1P_1$.

A specific method for preparing the iron-based nanocrystalline alloy is as follows.

(1) Compounding was performed according to the chemical formula of $Fe_{76.5}Si_{10}B_8Nb_1Cu_{1.5}Cr_1V_1P_1$ with industrially pure Fe, Si, FeB, FeP, Cu, V, Cr, and FeNb as raw materials so as to obtain a master alloy. The master alloy was subjected to melting and treatment by using a single-roller quenching technology to obtain a quenched amorphous strip with a width of about 60 mm and a thickness of about 18 μm, wherein a copper roller was rotated at a speed of 30 m/s. The strip was cut and wound into a magnetic core with a width of 10 mm, an inner diameter of 19.7 mm, and an outer diameter of 22.6 mm.

(2) The $Fe_{76.5}Si_{10}B_8Nb_1Cu_{1.5}Cr_1V_1P_1$ alloy was subjected to nanocrystalline heat treatment. The alloy strip was heated to 580° C. at a heating rate of 5° C./min for heat preservation for 0.5 hour, and then cooled to room temperature with a furnace.

(3) An alloy magnetic core obtained after the heat treatment was uniformly divided into 8 parts, which were heated to 200° C. at a heating rate of 10° C./min, heated to 380° C. at a heating rate of 10° C./min for heat preservation for 1 hour in a 0.08 T transverse magnetic field, put in a liquid nitrogen environment for 0.5 hour, taken out, and then put in an environment for heat preservation at 280° C. for 0.5 hour. A cycle of cooling and heating was repeated for 2 times.

(4) An initial magnetization curve of a magnetic ring was measured. In an initial magnetization curve stage, a tangent was obtained and extended to saturation magnetization. With the corresponding abscissa value as an anisotropy field ($H_k$), an induced anisotropy value is calculated based on the formula $K_u=½ H_kB_s$. After the heat treatment in step (2) and step (3), it was calculated that the nanocrystalline magnetic core has a $K_u$ value of 9 J/m$^3$. The crystallization volume fraction $V_{cr}$ and the grain size D were obtained according to analysis of XRD and TEM results. Based on the formula $<K_1>=K_1V_{cr}(D/L_0)^6$ ($K_1$ refers to magnetocrystalline anisotropy of an α-Fe(Si) phase and has a value of 8.2 KJ/m$^3$; $V_{cr}$ refers to crystallization volume fraction; and $L_0$ refers to ferromagnetic exchange length and has a value of about 35 nm), it was calculated that the $<K_1>$ value is 8.3 J/m$^3$. The $K_u$ value is similar to the $<K_1>$ value.

(5) A nanocrystalline obtained under the conditions of step (2) to step (4) has excellent soft magnetic properties at high frequency including a saturation magnetic induction intensity $B_s$ of 1.45 T, a coercivity $H_c$ of 2 A/m, a magnetic permeability μ of 22,000 at 100 kHz, and a loss $P_s$ of 230 kW/m$^3$ at 100 kHz and 0.2 T.

Comparative Example 1

(1) In Comparative Example 1, an alloy with a composition chemical formula of $Fe_{77.8}Si_{10}B_8Nb_{2.6}Cu_{0.6}P_1$ was subjected to treatment as step (1) in Example 1 to obtain a magnetic core, followed by conventional nanocrystalline heat treatment as step (2). That is to say, a $Fe_{77.8}Si_{10}B_8Nb_{2.6}Cu_{0.6}P_1$ alloy strip sample was heated to 560° C. at a heating rate of 5° C./min for heat preservation for 0.5 hour, and then cooled to room temperature with a furnace. As step (3) in Examples, the magnetic core was heated to 320° C. for heat preservation for 1 hour in a 0.08 T transverse magnetic field, put in a liquid nitrogen environment for 0.5 hour, taken out, and then put in an environment for heat preservation at 280° C. for 0.5 hour. A cycle of cooling and heating was repeated for 3 times.

(2) After the heat treatment in the magnetic field, the alloy has an average magnetic anisotropy $<K_1>$ value of 14.6 J/m$^3$ and an induced anisotropy $K_u$ value of 8.9 J/m$^3$, and the $<K_1>$ value and the $K_u$ value have a large difference.

(3) Under the conditions of step (1) to step (2), the saturation magnetic induction intensity $B_s$ is 1.49 T, the coercivity $H_c$ is 10 A/m, the magnetic permeability μ at 100 kHz is 7,000, and the loss $P_s$ at 100 kHz and 0.2 T is 640 kW/m$^3$.

Comparative Example 2

(1) As a contrast, in Comparative Example 2, an alloy with a composition chemical formula of $Fe_{77.8}Si_{10}B_8Nb_{2.6}Cu_{0.6}P_1$ was subjected to treatment as step (1) in Example 1 to obtain a magnetic core, followed by conventional nanocrystalline heat treatment as step (2). That is to say, a $Fe_{77.8}Si_{10}B_8Nb_{2.6}Cu_{0.6}P_1$ alloy strip sample was heated to 560° C. at a heating rate of 5° C./min for heat preservation for 0.5 hour, and then cooled to room temperature with a furnace. As step (3) in Examples, the magnetic core was heated to 360° C. for heat preservation for 1 hour in a 0.08 T transverse magnetic field, put in a liquid nitrogen environment for 0.5 hour, taken out, and then put in an environment for heat preservation at 280° C. for 0.5 hour. A cycle of cooling and heating was repeated for 3 times.

(2) After the heat treatment in the magnetic field, the alloy has an average magnetic anisotropy $<K_1>$ value of 15.1 J/m$^3$ and an induced anisotropy $K_u$ value of 10.9 J/m$^3$, and the $<K_1>$ value and the $K_u$ value have a large difference.

(3) Under the conditions of step (1) to step (2), the saturation magnetic induction intensity $B_s$ is 1.49 T, the coercivity $H_c$ is 3.6 A/m, the magnetic permeability μ at 100 kHz is 10,000, and the loss $P_s$ at 100 kHz and 0.2 Tis 380 kW/m$^3$.

Comparative Example 3

(1) In Comparative Example 3, an alloy with a composition chemical formula of $Fe_{77.8}Si_{10}B_8Nb_{2.6}Cu_{0.6}P_1$ was subjected to treatment as step (1) in Example 1 to obtain a magnetic core, followed by conventional nanocrystalline heat treatment as step (2). That is to say, a $Fe_{77.8}Si_{10}B_8Nb_{2.6}Cu_{0.6}P_1$ alloy strip sample was heated to 560° C. at a heating rate of 5° C./min for heat preservation for 0.5 hour, and then cooled to room temperature with a furnace. As step (3) in Examples, the magnetic core was heated to 440° C. for heat preservation for 1 hour in a 0.08 T transverse magnetic field, put in a liquid nitrogen environment for 0.5 hour, taken out, and then put in an environment for heat preservation at 280° C. for 0.5 hour. A cycle of cooling and heating was repeated for 3 times.

(2) After the heat treatment in the magnetic field, the alloy has an average magnetic anisotropy $<K_1>$ value of 16.7 J/m$^3$ and an induced anisotropy $K_u$ value of 22.8 J/m$^3$, and the $<K_1>$ value and the $K_u$ value have a large difference.

(3) Under the conditions of step (1) to step (2), the saturation magnetic induction intensity $B_s$ is 1.49 T, the coercivity $H_c$ is 5 A/m, the magnetic permeability μ at 100 kHz is 15,000, and the loss $P_s$ at 100 kHz and 0.2 T is 540 kW/m$^3$.

Comparative Example 4

(1) In Comparative Example 4, an alloy with a composition chemical formula of $Fe_{77.8}Si_{10}B_8Nb_{2.6}Cu_{0.6}P_1$ was subjected to treatment as step (1) in Example 1 to obtain a magnetic core, followed by conventional nanocrystalline heat treatment as step (2). That is to say, a $Fe_{77.8}Si_{10}B_8Nb_{2.6}Cu_{0.6}P_1$ alloy strip sample was heated to 560° C. at a heating rate of 5° C./min for heat preservation for 0.5 hour, and then cooled to room temperature with a furnace. As step (3) in Examples, the magnetic core was heated to 500° C. for heat preservation for 1 hour in a 0.08 T transverse magnetic field, put in a liquid nitrogen environment for 0.5 hour, taken out, and then put in an environment for heat preservation at 280° C. for 0.5 hour. A cycle of cooling and heating was repeated for 3 times.

(2) After the heat treatment in the magnetic field, the alloy has an average magnetic anisotropy $<K_1>$ value of 20.1 J/m$^3$ and an induced anisotropy $K_u$ value of 25.1 J/m$^3$, and the $<K_1>$ value and the $K_u$ value have a large difference.

(3) Under the conditions of step (1) to step (2), the saturation magnetic induction intensity $B_s$ is 1.49 T, the coercivity $H_c$ is 11 A/m, the magnetic permeability μ at 100 kHz is 8,000, and the loss $P_s$ at 100 kHz and 0.2 T is 600 kW/m$^3$.

Comparative Examples 1-4

The alloys in Comparative Examples 1-4 and Example 2 have the composition of $Fe_{77.8}Si_{10}B_8Nb_{2.6}Cu_{0.6}P_1$, and preparation methods and methods for testing soft magnetic properties of the alloys were basically the same as those in Example 2. Different from Example 2, a process for heat treatment of the alloys in Comparative Examples 1-4 was carried out at a temperature of 320° C., 360° C., 440° C., and 480° C. respectively. Specific results are as shown in Table 1.

TABLE 1

| Comparative Example | Heat preservation temperature (° C.) | $<K_1>$ (J/m$^3$) | $K_u$ (J/m$^3$) | μ | $P_s$ (kW/m$^3$) |
|---|---|---|---|---|---|
| 1 | 320 | 14.6 | 8.9 | 7000 | 640 |
| 2 | 360 | 15.1 | 10.9 | 10000 | 380 |
| 3 | 440 | 16.7 | 22.8 | 15000 | 540 |
| 4 | 480 | 20.1 | 25.1 | 8000 | 600 |

Comparative Example 5

In Comparative Example 5, an alloy has a composition chemical formula of $Fe_{77}Si_{12}B_7Nb_2Cu_1Al_1$.

A specific method for preparing the iron-based nanocrystalline alloy is as follows.

(1) Compounding was performed according to the chemical formula of $Fe_{77}Si_{12}B_7Nb_2Cu_1Al_1$ with industrially pure Fe, Si, FeB, Al, Cu, and Nb as raw materials so as to obtain a master alloy. The master alloy was subjected to melting and treatment by using a single-roller quenching technology to obtain a quenched amorphous strip with a width of about 60 mm and a thickness of about 18 μm, wherein a copper roller was rotated at a speed of 30 m/s. The strip was cut and wound into a magnetic core with a width of 10 mm, an inner diameter of 19.7 mm, and an outer diameter of 22.6 mm.

(2) The $Fe_{77}Si_{12}B_7Nb_2Cu_1P_1$ alloy was subjected to nanocrystalline heat treatment. The alloy strip was heated to 560° C. at a heating rate of 5° C./min for heat preservation for 0.5 hour, and then cooled to room temperature with a furnace.

(3) An alloy magnetic core obtained after the heat treatment was uniformly divided into 8 parts, which were heated to 200° C. at a heating rate of 10° C./min, heated to 420° C. at a heating rate of 10° C./min for heat preservation for 1 hour in a 0.08 T transverse magnetic field, put in a liquid nitrogen environment for 0.5 hour, taken out, and then put in an environment for heat preservation at 200° C. for 0.5 hour. A cycle of cooling and heating was repeated for 2 times.

(4) After the heat treatment in the magnetic field in step (2) and step (3), the alloy has an average magnetic anisotropy $<K_1>$ value of 36.6 J/m$^3$ and an induced anisotropy $K_u$ value of 42.9 J/m$^3$, and the $<K_1>$ value and the $K_u$ value have a large difference and large values.

(5) Under the conditions of step (1) to step (4), the saturation magnetic induction intensity $B_s$ is 1.4 T, the coercivity $H_c$ is 26 A/m, the magnetic permeability μ at 100 kHz is 8,000, and the loss $P_s$ at 100 kHz and 0.2 T is 750 kW/m$^3$.

Comparative Example 6

In Comparative Example 6, an alloy has a composition chemical formula of $Fe_{74}Si_{13}B_6P_4Cu_2C_1$.

A specific method for preparing the iron-based nanocrystalline alloy is as follows.

(1) Compounding was performed according to the chemical formula of $Fe_{74}Si_{13}B_6P_4Cu_2C_1$ with industrially pure Fe, Si, FeB, FeP, Cu, and FeC as raw materials so as to obtain a master alloy. The master alloy was subjected to melting and treatment by using a single-roller quenching technology to obtain a quenched amorphous strip with a width of about 60 mm and a thickness of about 18 μm, wherein a copper roller was rotated at a speed of 30 m/s. The strip was cut and wound into a magnetic core with a width of 10 mm, an inner diameter of 19.7 mm, and an outer diameter of 22.6 mm.

(2) The $Fe_{74}Si_{13}B_6P_4Cu_2C_1$ alloy was subjected to nanocrystalline heat treatment. The alloy strip was heated to 540°

C. at a heating rate of 5° C./min for heat preservation for 0.5 hour, and then cooled to room temperature with a furnace.

(3) An alloy magnetic core obtained after the heat treatment was uniformly divided into 8 parts, which were heated to 200° C. at a heating rate of 10° C./min, heated to 400° C. at a heating rate of 10° C./min for heat preservation for 1 hour in a 0.08 T transverse magnetic field, put in a liquid nitrogen environment for 0.5 hour, taken out, and then put in an environment for heat preservation at 240° C. for 1 hour. A cycle of cooling and heating was repeated for 2 times.

(4) After the heat treatment in the magnetic field in step (2) and step (3), the alloy has an average magnetic anisotropy $\langle K_1 \rangle$ value of 4.6 J/$m^3$ and an induced anisotropy $K_u$ value of 6.9 J/$m^3$, and the $\langle K_1 \rangle$ value and the $K_u$ value have a large difference and small values.

(5) Under the conditions of step (1) to step (4), the saturation magnetic induction intensity $B_s$ is 1.42 T, the coercivity $H_c$ is 34 A/m, the magnetic permeability μ at 100 kHz is 7,000, and the loss $P_s$ at 100 kHz and 0.2 T is 630 kW/$m^3$.

Comparative Examples 5 and 6 and Examples 1-6

In Comparative Examples 5 and 6, preparation methods and methods for testing soft magnetic properties of the alloys were basically the same as those in Examples 1-6. The differences are that the alloys were different in composition and were subjected to heat treatment at different temperatures under different conditions to obtain optimal anisotropy values and soft magnetic properties. Specific results are as shown in Table 2.

and an induced anisotropy $K_u$ value of 8.1 J/$m^3$, and the $\langle K_1 \rangle$ value and the $K_u$ value have a large difference.

(3) Under the conditions of step (1) to step (2), the saturation magnetic induction intensity $B_s$ is 1.42 T, the coercivity $H_c$ is 5 A/m, the magnetic permeability μ at 100 kHz is 11,000, and the loss $P_s$ at 100 kHz and 0.2 T is 440 kW/$m^3$.

Comparative Example 8

(1) As a contrast, in Comparative Example 8, an alloy with a composition chemical formula of $Fe_{77}Si_{12}B_7Nb_2Cu_1P_1$ was subjected to treatment as step (1) in Example 1 to obtain a magnetic core, followed by conventional nanocrystalline heat treatment as step (2). That is to say, a $Fe_{77}Si_{12}B_7Nb_2Cu_1P_1$ alloy strip sample was heated to 580° C. at a heating rate of 5° C./min for heat preservation for 0.5 hour, and then cooled to room temperature with a furnace. As step (3) in Examples, the magnetic core was heated to 380° C. for heat preservation for 1 hour in a 0.08 T transverse magnetic field, put in a liquid nitrogen environment for 0.5 hour, taken out, and then put in an environment for heat preservation at 150° C. for 1 hour. A cycle of cooling and heating was repeated for 2 times.

(2) After the heat treatment in the magnetic field, the alloy has an average magnetic anisotropy $\langle K_1 \rangle$ value of 11.5 J/$m^3$ and an induced anisotropy $K_u$ value of 9.2 J/$m^3$, and the $\langle K_1 \rangle$ value and the $K_u$ value have a large difference.

(3) Under the conditions of step (1) to step (2), the saturation magnetic induction intensity $B_s$ is 1.41 T, the coercivity $H_c$ is 3 A/m, the magnetic permeability μ at 100 kHz is 15.000, and the loss $P_s$ at 100 kHz and 0.2 T is 420 kW/$m^3$.

TABLE 2

| Example | Composition of alloy | $\langle K_1 \rangle$ (J/$m^3$) | $K_u$ (J/$m^3$) | $B_s$ (T) | μ | $P_s$ (kW/$m^3$) |
|---|---|---|---|---|---|---|
| Example 1 | $Fe_{76}Si_{11}B_8Nb_2Cu_1Mo_1P_1$ | 12.8 | 13 | 1.5 | 21600 | 180 |
| Example 2 | $Fe_{77.8}Si_{10}B_8Nb_{2.6}Cu_{0.6}P_1$ | 16.1 | 15.8 | 1.5 | 20000 | 205 |
| Example 3 | $Fe_{77}Si_{12}B_7Nb_2Cu_1P_1$ | 8.6 | 8.3 | 1.46 | 25000 | 220 |
| Example 4 | $Fe_{73.7}Si_{11}B_{10}Nb_{2.5}Cu_1Mn_1P_{0.8}$ | 11.7 | 12.2 | 1.45 | 23400 | 250 |
| Example 5 | $Fe_{77.5}Si_{12}B_6Nb_1Cu_{1.5}Mo_{0.5}V_{0.5}P_1$ | 18.9 | 19 | 1.52 | 20300 | 190 |
| Example 6 | $Fe_{76.5}Si_{10}B_8Nb_1Cu_{1.5}Cr_1V_1P_1$ | 8.3 | 9 | 1.45 | 22000 | 230 |
| Comparative Example 5 | $Fe_{77}Si_{12}B_7Nb_2Cu_1Al_1$ | 36.6 | 42.9 | 1.4 | 8000 | 750 |
| Comparative Example 6 | $Fe_{74}Si_{13}B_6P_4Cu_2C_1$ | 4.6 | 6.9 | 1.42 | 7000 | 630 |

Comparative Example 7

(1) As a contrast, in Comparative Example 7, an alloy with a composition chemical formula of $Fe_{77}Si_{12}B_7Nb_2Cu_1P_1$ was subjected to treatment as step (1) in Example 1 to obtain a magnetic core, followed by conventional nanocrystalline heat treatment as step (2). That is to say, a $Fe_{77}Si_{12}B_7Nb_2Cu_1P_1$ alloy strip sample was heated to 580° C. at a heating rate of 5° C./min for heat preservation for 0.5 hour, and then cooled to room temperature with a furnace. As step (3) in Examples, the magnetic core was heated to 380° C. for heat preservation for 1 hour in a 0.08 T transverse magnetic field, and then cooled to room temperature with a furnace.

(2) After the heat treatment in the magnetic field, the alloy has an average magnetic anisotropy $\langle K_1 \rangle$ value of 10.6 J/$m^3$ Comparative Examples 7 and 8 and Example 3

In Comparative Examples 7 and 8, the composition, the thermal field, and the heat treatment in the magnetic field were basically the same as those in Example 3. The difference was a process for treatment in a cold field. In Comparative Example 7, treatment in a cold field was not conducted. In Comparative Example 8, treatment in a cold field was not conducted under limited conditions, and was conducted at different temperatures under different treatment conditions to obtain anisotropy values and soft magnetic properties. Specific results are as shown in Table 3.

TABLE 3

| Example | Composition of alloy | $<K_1>$ (J/m$^3$) | $K_u$ (J/m$^3$) | $B_s$ (T) | μ | $P_s$ (kW/m$^3$) |
|---|---|---|---|---|---|---|
| Example 3 | $Fe_{77}Si_{12}B_7Nb_2Cu_1P_1$ (cooled to 220° C.) | 8.6 | 8.3 | 1.46 | 25000 | 220 |
| Comparative Example 7 | $Fe_{77}Si_{12}B_7Nb_2Cu_1P_1$ (without a cold field) | 10.6 | 8.1 | 1.42 | 11000 | 440 |
| Comparative Example 8 | $Fe_{77}Si_{12}B_7Nb_2Cu_1P_1$ (cooled to 150° C.) | 11.5 | 9.2 | 1.41 | 15000 | 420 |

Analysis of Test Results of Properties in Examples 1-6 and Comparative Examples 1-8

1. Magnetic Anisotropy of Alloys

An initial magnetization curve of a magnetic ring is measured. In an initial magnetization curve stage, a tangent was obtained and extended to saturation magnetization. With the corresponding abscissa value as an anisotropy field ($H_k$), an induced anisotropy $K_u$ value was calculated based on the formula $K_u=\frac{1}{2} H_kB_s$. The crystallization volume fraction $V_{cr}$ and the grain size D were obtained according to analysis of XRD and TEM results. Based on the formula $<K_1>=K_1V_{cr}(D/L_0)^6$, the $<K_1>$ value was calculated. Results of the magnetic anisotropy of the alloys in Examples 1-6 and Comparative Examples 1-8 after heat treatment at different temperatures for different times are as shown in Table 4.

TABLE 4

| Example | Composition of alloy | $<K_1>$ (J/m$^3$) | $K_u$ (J/m$^3$) |
|---|---|---|---|
| Example 1 | $Fe_{76}Si_{11}B_8Nb_2Cu_1Mo_1P_1$ | 12.8 | 13 |
| Example 2 | $Fe_{77.8}Si_{10}B_8Nb_{2.6}Cu_{0.6}P_1$ | 16.1 | 15.8 |
| Example 3 | $Fe_{77}Si_{12}B_7Nb_2Cu_1P_1$ | 8.3 | 8.6 |
| Example 4 | $Fe_{73.7}Si_{11}B_{10}Nb_{2.5}Cu_1Mn_1P_{0.8}$ | 11.7 | 12.2 |
| Example 5 | $Fe_{77.5}Si_{12}B_6Nb_1Cu_{1.5}Mo_{0.5}V_{0.5}P_1$ | 18.9 | 19 |
| Example 6 | $Fe_{76.5}Si_{10}B_8Nb_1Cu_{1.5}Cr_1V_1P_1$ | 8.3 | 9 |
| Comparative Example 1 | $Fe_{77.8}Si_{10}B_8Nb_{2.6}Cu_{0.6}P_1$ | 14.6 | 8.9 |
| Comparative Example 2 | $Fe_{77.8}Si_{10}B_8Nb_{2.6}Cu_{0.6}P_1$ | 15.1 | 10.9 |
| Comparative Example 3 | $Fe_{77.8}Si_{10}B_8Nb_{2.6}Cu_{0.6}P_1$ | 16.7 | 22.8 |
| Comparative Example 4 | $Fe_{77.8}Si_{10}B_8Nb_{2.6}Cu_{0.6}P_1$ | 20.1 | 25.1 |
| Comparative Example 5 | $Fe_{77}Si_{12}B_7Nb_2Cu_1Al_1$ | 36.6 | 42.9 |
| Comparative Example 6 | $Fe_{74}Si_{13}B_6P_4Cu_2C_1$ | 4.6 | 6.9 |
| Comparative Example 7 | $Fe_{77}Si_{12}B_7Nb_2Cu_1P_1$ | 10.6 | 8.1 |
| Comparative Example 8 | $Fe_{77}Si_{12}B_7Nb_2Cu_1P_1$ | 11.5 | 9.2 |

Figure 3:
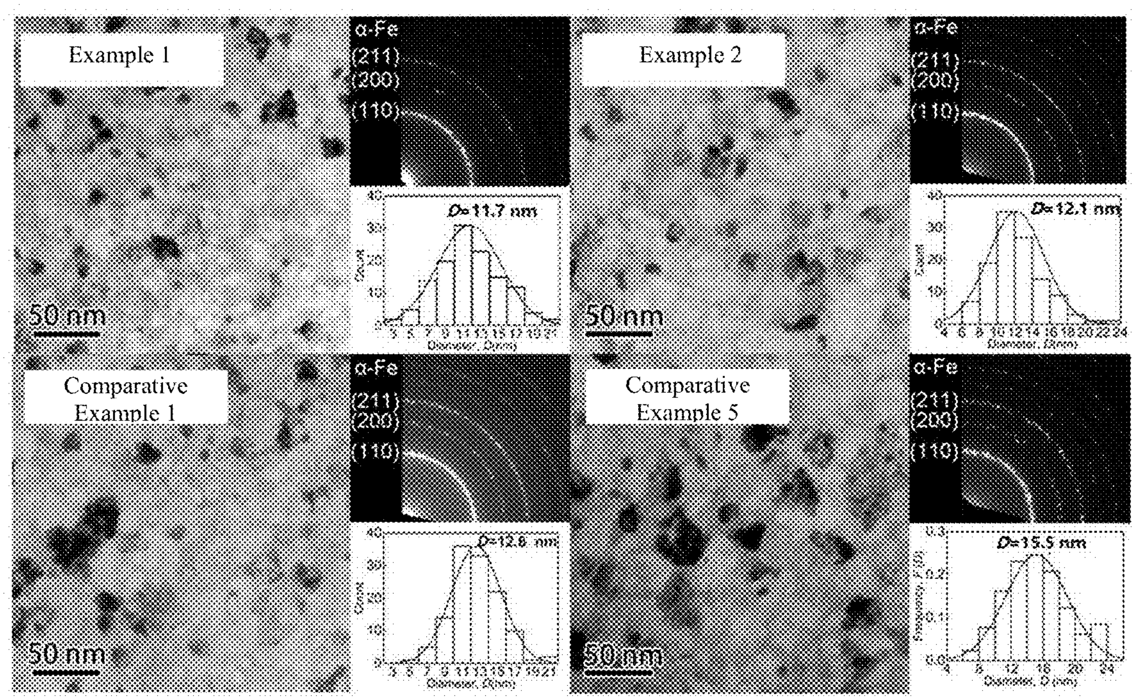
FIG. 3 is a diagram showing transmission electron micrographs, selected diffraction patterns, and statistical distribution charts of grain size (D) of samples prepared in Example 1, Example 2, Comparative Example 1, and Comparative Example 5.

In Comparative Example 5 and Examples 1-6, the alloys were compared in composition. In Examples 1-6, the element P was used for doping, so that the $<K_1>$ value was effectively decreased, and was less than 20 J/m$^3$. In Comparative Example 5, the grain size was large, as shown in FIG. 3, and it was calculated that the $<K_1>$ value was large, and was greater than 20 J/m$^3$. In Comparative Example 6, the value was too small, and the $K_u$ value was not similar to the $<K_1>$ value. It was indicated that due to the doping with the element P, the nucleation rate of a grain was increased under the condition of ensuring the saturation magnetic induction intensity, the growth rate of the grain was inhibited, and convenience was provided for obtaining a fine and uniform nanocrystalline structure. A nanocrystalline alloy with a low $<K_1>$ value was obtained, convenience was provided for adjusting the ratio of the $K_u$ value to the $<K_1>$ value, and soft magnetic properties of the alloy at high frequency were improved. In Examples 1-6, after the doping with P, the nanocrystalline alloys with a low $<K_1>$ value were subjected to annealing in a magnetic field, and the $K_u$ value was similar to the $<K_1>$ value.

In Comparative Examples 1 and 2, Example 2, and Comparative Examples 3 and 4, the alloys have the composition of $Fe_{77.8}Si_{10}B_8Nb_{2.6}Cu_{0.6}P_1$, the process for heat treatment in a magnetic field was carried out at a temperature of 320° C., 360° C., 400° C., 440° C., and 480° C. respectively, and anisotropic values were as shown in FIG. 1. With increase of the annealing temperature, the $K_u$ value and the $<K_1>$ value were increased. However, the increasing trend of the $K_u$ value was higher than that of the $<K_1>$ value. It can be seen obviously that when the annealing temperature was 400° C. (in Example 2), the $K_u$ value was nearly equal to the $<K_1>$ value.

In Comparative Examples 7 and 8 and Example 3, the alloys have the composition of $Fe_{77}Si_{12}B_7Nb_2Cu_1P_1$, and the thermal field and the heat treatment in the magnetic field were the same. The difference was a process for treatment in a cold field. In Comparative Example 7, treatment in a cold field was not conducted. In Comparative Example 8, treatment in a cold field was not conducted under limited conditions, and the $K_u$ value was not similar to the $<K_1>$ value.

2. Soft Magnetic Properties of Alloys

Figure 2:
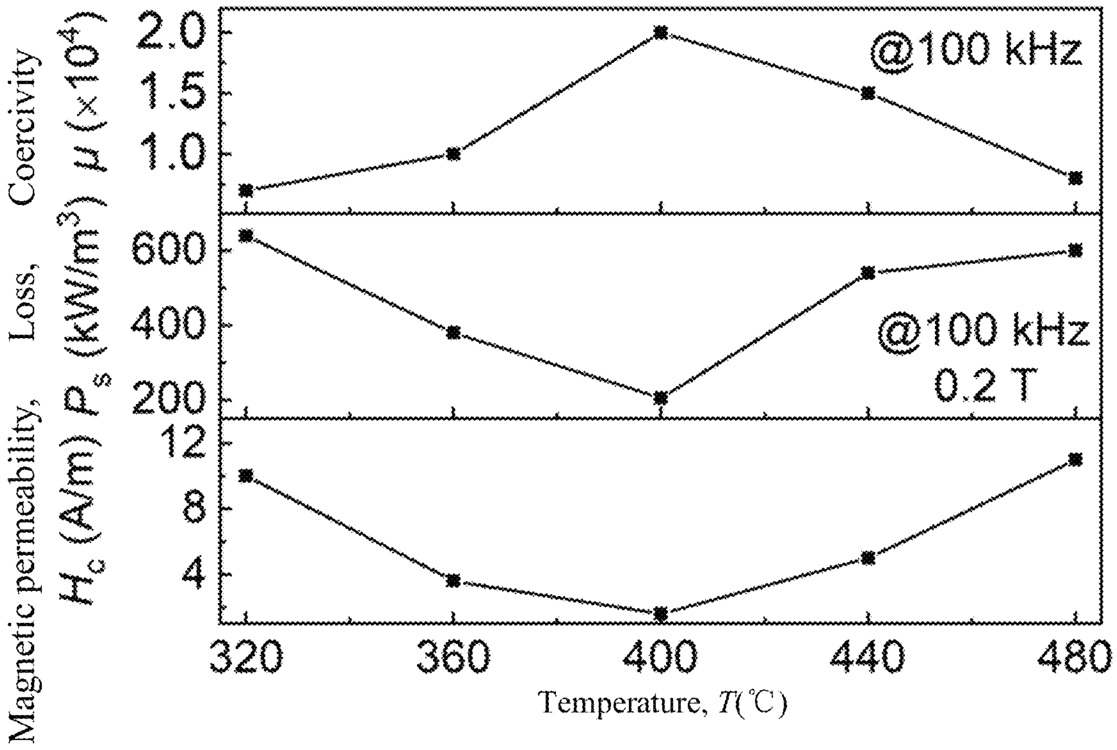
FIG. 2 is a diagram showing comparison of soft magnetic properties including the magnetic permeability μ, the coercivity $H_c$, and the loss $P_s$ of the $Fe_{77.8}Si_{10}B_8Nb_{2.6}Cu_{0.6}P_1$ prepared in Comparative Examples 1 and 2, Example 2, and Comparative Examples 3 and 4.

The saturation magnetic induction intensity $B_s$, coercivity $P_s$, and magnetic permeability μ of the nanocrystalline soft magnetic alloys after heat treatment at different temperatures for different times in Examples 1-6 and Comparative Examples 1-8 were tested by using a vibrating sample magnetometer (Lakeshore7410), a direct current B-H tester (EXPH-100), and an impedance analyzer (Agilent 4294 A) respectively. Results are as shown in FIG. 2 and Table 5.

TABLE 5

| Example | Composition of alloy | $B_s$ (T) | $H_c$ (A/m) | μ | $P_s$ (kW/m$^3$) |
|---|---|---|---|---|---|
| Example 1 | $Fe_{76}Si_{11}B_8Nb_2Cu_1Mo_1P_1$ | 1.5 | 1.5 | 21600 | 180 |
| Example 2 | $Fe_{77.8}Si_{10}B_8Nb_{2.6}Cu_{0.6}P_1$ | 1.5 | 1.6 | 20000 | 205 |

TABLE 5-continued

| Example | Composition of alloy | $B_s$ (T) | $H_c$ (A/m) | μ | $P_s$ (kW/m$^3$) |
|---|---|---|---|---|---|
| Example 3 | $Fe_{77}Si_{12}B_7Nb_2Cu_1P_1$ | 1.46 | 2 | 25000 | 220 |
| Example 4 | $Fe_{73.7}Si_{11}B_{10}Nb_{2.5}Cu_1Mn_1P_{0.8}$ | 1.45 | 1.8 | 23400 | 250 |
| Example 5 | $Fe_{77.5}Si_{12}B_6Nb_1Cu_{1.5}Mo_{0.5}V_{0.5}P_1$ | 1.52 | 1.5 | 20300 | 190 |
| Example 6 | $Fe_{76.5}Si_{10}B_8Nb_1Cu_{1.5}Cr_1V_1P_1$ | 1.45 | 2 | 22000 | 230 |
| Comparative Example 1 | $Fe_{77.8}Si_{10}B_8Nb_{2.6}Cu_{0.6}P_1$ | 1.49 | 10 | 7000 | 640 |
| Comparative Example 2 | $Fe_{77.8}Si_{10}B_8Nb_{2.6}Cu_{0.6}P_1$ | 1.49 | 3.6 | 10000 | 380 |
| Comparative Example 3 | $Fe_{77.8}Si_{10}B_8Nb_{2.6}Cu_{0.6}P_1$ | 1.49 | 5 | 15000 | 540 |
| Comparative Example 4 | $Fe_{77.8}Si_{10}B_8Nb_{2.6}Cu_{0.6}P_1$ | 1.49 | 11 | 8000 | 600 |
| Comparative Example 5 | $Fe_{77}Si_{12}B_7Nb_2Cu_1Al_1$ | 1.4 | 26 | 8000 | 750 |
| Comparative Example 6 | $Fe_{74}Si_{13}B_6P_4Cu_2C_1$ | 1.42 | 34 | 7000 | 630 |
| Comparative Example 7 | $Fe_{77}Si_{12}B_7Nb_2Cu_1P_1$ | 1.42 | 5 | 11000 | 440 |
| Comparative Example 8 | $Fe_{77}Si_{12}B_7Nb_2Cu_1P_1$ | 1.41 | 3 | 15000 | 420 |

In Comparative Examples 1 and 2, Example 2, and Comparative Examples 3 and 4, the alloys have the composition of $Fe_{77.8}Si_{10}B_8Nb_{2.6}Cu_{0.6}P_1$, the process for heat treatment in a magnetic field was carried out at a temperature of 320° C., 360° C., 400° C., 440° C., and 480° C. respectively, and soft magnetic properties are as shown in FIG. 2. When the annealing temperature was 400° C. (in Example 2), the soft magnetic properties are optimal.

3. Microstructures of Alloys

In order to further explain why the nanocrystalline soft magnetic alloy of the present disclosure has excellent soft magnetic properties at high frequency, microstructures of samples in Example 1 ($Fe_{76}Si_{11}B_8Nb_2Cu_1Mo_1P_1$), Example 2 ($Fe_{77.8}Si_{10}B_8Nb_{2.6}Cu_{0.6}P_1$ at 400° C.), Comparative Example 1 ($Fe_{77.8}Si_{10}B_8Nb_{2.6}Cu_{0.6}P_1$ at 320° C.), and Comparative Example 5 ($Fe_{77}Si_{12}B_7Nb_2Cu_1Al_1$) were analyzed by using a Talos transmission electron microscope.

Results are as shown in FIG. 3. All crystal phases consist of amorphous phases and nanometer α-Fe grains. In Examples 1 and 2, due to the addition of a trace amount of the element P, the magnetocrystalline anisotropy was reduced, and the growth of a grain was inhibited. According to morphology maps and selected diffraction patterns, it was shown that fine and uniform grains precipitated are embedded on amorphous matrices at optimal annealing temperatures. The grains are α-Fe grains, and have a grain size (D) of 11.7 nm and 12.1 nm respectively. In Comparative Example 1 and Example 2, the nanocrystallines obtained from the alloy with the same composition in a magnetic field at different annealing temperatures are compared. In Example 2, the D value was 12.6 nm, indicating that the grain size was basically unchanged after annealing in a magnetic field. In Comparative Example 5, the D value was 15.5 nm. The grain size was slightly large, the magnetocrystalline anisotropy is large, and the soft magnetic properties are poor.

The invention claimed is:

1. A nanocrystalline soft magnetic alloy, wherein the nanocrystalline soft magnetic alloy has a molecular formula of $Fe_aSi_bB_cM_dCu_eP_f$, in which M comprises one or more of Nb, Mo, V, Mn, and Cr, molar percent contents of elements are as follows: a=100-b-c-d-e-f, 6≤b≤15, 5≤c≤12, 0.5≤d≤3, 0.5≤e≤1.5, and 0.5≤f≤3; and a difference between an induced anisotropy value and an average magnetocrystalline anisotropy value is 0.1-1 J/m$^3$.

2. The nanocrystalline soft magnetic alloy according to claim 1, wherein both the induced anisotropy value and the average magnetocrystalline anisotropy value are greater than 5 J/m$^3$ and less than 20 J/m$^3$.

3. The nanocrystalline soft magnetic alloy according to claim 1, wherein the nanocrystalline soft magnetic alloy has a saturation magnetic induction intensity $B_s$ of greater than 1.45 T and a coercivity of less than 2 A/m.

4. The nanocrystalline soft magnetic alloy according to claim 1, wherein the nanocrystalline soft magnetic alloy has a magnetic permeability of greater than 20,000 at a frequency of less than 100 kHz.

5. The nanocrystalline soft magnetic alloy according to claim 1, wherein the nanocrystalline soft magnetic alloy has a loss of less than 250 kW/m$^3$ at a frequency of less than 100 kHz in a transverse magnetic field of less than 0.2 T.

6. The nanocrystalline soft magnetic alloy according to claim 1, wherein, in the molecular formula of $Fe_aSi_bB_cM_dCu_eP_f$, molar percent content of Fe is as follows: 65.5≤a≤87.5.

7. The nanocrystalline soft magnetic alloy according to claim 1, wherein, in the molecular formula of $Fe_aSi_bB_cM_dCu_eP_f$, molar percent content of Fe is as follows: 73.7≤a≤77.8.

8. A method for preparing the nanocrystalline soft magnetic alloy according to claim 1, comprising:

(1) performing compounding according to the atomic percent molecular formula of the nanocrystalline soft magnetic alloy so as to obtain a master alloy; melting the master alloy to obtain a melt, and spraying the melt onto a rotating cooling copper roller for cooling and solidification to obtain an amorphous alloy with a quenched alloy strip; and preparing a magnetic core from the quenched alloy strip by a superimposed cutting method and a winding method;

(2) putting the magnetic core in a thermal field for heat preservation at 480-640° C. for 0.5-1.5 hours; putting the magnetic core in a 0-1 T transverse magnetic field for heat preservation at 380-420° C. for 0.5-1.5 hours; putting the magnetic core in a liquid nitrogen environment for cooling for 0.5-1 hour; taking the magnetic core out of the liquid nitrogen environment; and then putting the magnetic core in an environment for heat preservation at 200-300° C. for 0.5-1 hour; and (3) repeating step (2) for 1-5 times to obtain the nanocrystalline soft magnetic alloy with high magnetic induction and high frequency.

9. The method for preparing the nanocrystalline soft magnetic alloy according to claim 8, wherein the magnetic core is a cylinder.

10. The method for preparing the nanocrystalline soft magnetic alloy according to claim 8, wherein the magnetic core is a cylinder with an outer diameter of 21-23 mm and an inner diameter of 18-20 mm.

11. The method for preparing the nanocrystalline soft magnetic alloy according to claim 8, wherein the cooling copper roller is rotated at a speed of 25 m/s to 40 m/s.

12. The method for preparing the nanocrystalline soft magnetic alloy according to claim 8, wherein before the magnetic core is put in the transverse magnetic field, the magnetic core has a grain size of 10-20 nm.

13. The method for preparing the nanocrystalline soft magnetic alloy according to claim 9, wherein the magnetic core is a cylinder with an outer diameter of 21-23 mm and an inner diameter of 18-20 mm.

* * * * *